Patented June 23, 1942

2,287,107

UNITED STATES PATENT OFFICE 2,287,107

DELTA$^{2,6}$-PHYTADIENIC ACID AND PROCESS FOR THE MANUFACTURE OF SAME

Paul Karrer, Zurich, Switzerland, assignor to Hoffmann-La Roche Inc., Nutley, N. J., a corporation of New Jersey No Drawing. Application September 5, 1941, Serial No. 409,739. In Switzerland July 11, 1940

3 Claims. (Cl. 260—413)

No unsaturated carboxylic acid with two double bonds derived from phytanic acid was hitherto known. It has now been found that delta $^{2,6}$-phytadienic acid (IV) can be obtained by reacting unsaturated methyl-[4,8,12-trimethyl-tridecene-(3)-yl]-ketone (I) with halogen acetic ester and zinc-copper couple, introducing halogen instead of the hydroxyl group in the resulting 3,7,11,15-tetramethyl-3-hydroxy-hexadecene-(6)-acid ester (II) and causing alcoholic alkali to act on the resulting 3,7,11,15-tetramethyl-3-halogen-hexadecene-(6)-acid ester (III).

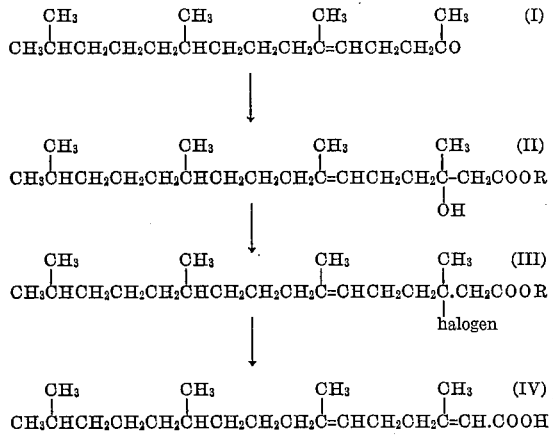

The success of this reaction could not be anticipated as it had to be feared that the double bond in the methyl-[4,8,12-trimethyl-tridecene-(3)-yl]-ketone used as starting material would disturb the course of the reaction.

The new compound has valuable therapeutic properties since it has an action similar to that exerted by the so-called vitamin F. It is to be used in medicinal preparations.

*Example*

22 parts by weight of unsaturated methyl-[4,8,12-trimethyl-tridecene-(3)-yl]-ketone are heated with 12.5 parts by weight of bromo-acetic ester and 20 parts by weight of zinc-copper couple in 80 parts by weight of toluene on a water bath. When the initially rapid reaction has somewhat died away, the reaction product is heated for 2 hours in an oil bath to 120° C. under reflux. After cooling, the toluene solution is washed three times with 2-n acetic acid and then with water until neutral. The toluene layer is now dried over sodium sulfate, filtered and the solvent evaporated in vacuo. On distillation in high vacuo the crude product yields a main fraction which distils over under a pressure of 0.07 mm. at 169-170° C, which represents 3,7,11,15-tetramethyl-3-hydroxy-hexadecene-6-acid ester.

28 parts by weight of this unsaturated 3,7,11,15-tetramethyl-3-hydroxy-hexadecene-(6)-acid ester are mixed with 23 parts by weight of phosphorus-tribromide in 80 parts by weight of absolute petroleum ether and left to stand for 2 hours at room temperature. The mixture is then heated for another 2 hours to 60° C. in an oil bath. On heating, hydrogen bromide escapes and the reaction mixture slowly becomes turbid. After cooling, it is poured into water, a little petroleum ether added and the petroleum ether layer 5 times washed with water. Emulsions that sometimes result can be resolved by addition of alcohol. After drying over sodium sulfate, the petroleum ether solution is filtered and the solvent evaporated in vacuo.

For the purpose of splitting off the hydrogen bromide from 3,7,11,15-tetramethyl-3-bromo-hexadecene-(6)-acid ester thus obtained, the crude product is heated for 2 hours to 80° C. with 30 parts by weight of 5% alcoholic potassium hydroxide, the greater part of the alcohol is then distilled off in vacuo, the residue mixed with 100 parts by weight of 2-n aqueous caustic soda and 10 parts by weight of alcohol and heated to 80° C. for one hour. On cooling the reaction mixture, the greater part of the sodium salt of phytadienic acid separates in the form of soap. The liquid is acidified with sulfuric acid, phytadienic acid extracted by ether, the ether solution evaporated and the acid distilled under a pressure of 0.06 mm. At this pressure the compound distils at about 148-152° C. as an almost colorless oil.

I claim:

1. Delta$^{2,6}$-phytadienic acid.

2. Process for the manufacture of delta$^{2,6}$-phytadienic acid, comprising reacting unsaturated methyl-[4,8,12-trimethyl-tridecene-(3)-yl]-ketone with halogen acetic ester, replacing the hydroxyl group in the resulting 3,7,11,15-tetramethyl-3-hydroxy-hexadecene-(6)-acid ester by a halogen group, and causing alcoholic potassium hydroxide to act on the 3,7,11,15-tetramethyl-3-halogen-hexadecene-(6)-acid ester obtained.

3. Process for the manufacture of delta$^{2,6}$-phytadienic acid, comprising reacting unsaturated methyl-[4,8,12-trimethyl-tridecene-(3)-yl]-ketone with bromo-acetic ester, replacing the hydroxyl group in the resulting 3,7,11,15-tetramethyl-3-hydroxy-hexadecene-(6)-acid ester by a bromo-group, and causing alcoholic potassium hydroxide to act on the 3,7,11,15-tetramethyl-3-bromo-hexadecene-(6)-acid ester obtained.

PAUL KARRER.